(12) United States Patent
Weber et al.

(10) Patent No.: US 8,033,944 B2
(45) Date of Patent: Oct. 11, 2011

(54) DIFFERENTIAL GEAR

(75) Inventors: Gunter Weber, Deutsch Kaltenbrunn (AT); August Kriebernegg, Koeflach (AT)

(73) Assignee: MAGNA Powertrain AG & Co KG, Lannach (AT)

( * ) Notice: Subject to any disclaimer, the term of this patent is extended or adjusted under 35 U.S.C. 154(b) by 292 days.

(21) Appl. No.: 12/388,800

(22) Filed: Feb. 19, 2009

(65) Prior Publication Data

US 2009/0215574 A1    Aug. 27, 2009

(30) Foreign Application Priority Data

Feb. 21, 2008 (DE) .................. 10 2008 010 306

(51) Int. Cl.
*F16H 48/06* (2006.01)
(52) U.S. Cl. ........................ 475/235; 475/240
(58) Field of Classification Search .......... 475/230, 475/231, 235, 240; 267/162
See application file for complete search history.

(56) References Cited

U.S. PATENT DOCUMENTS

| | | | | |
|---|---|---|---|---|
| 3,259,383 A | * | 7/1966 | Johnson et al. | 267/161 |
| 4,513,635 A | | 4/1985 | Takimura | |
| 4,959,043 A | * | 9/1990 | Klotz et al. | 475/230 |
| 5,221,238 A | * | 6/1993 | Bawks et al. | 475/226 |
| 6,254,071 B1 | * | 7/2001 | Greenhill | 267/161 |
| 7,278,948 B2 | * | 10/2007 | Cradit | 475/235 |
| 2007/0287569 A1 | * | 12/2007 | Miah | 475/235 |

FOREIGN PATENT DOCUMENTS

| | | |
|---|---|---|
| DE | 195 46 331 | 9/1996 |
| DE | 196 37 120 | 9/1996 |

OTHER PUBLICATIONS

English Machine Translation of German Patent No. DE 196 37 120 to Mauritz, Sep. 1996.*
Communication (and translation) from German Patent and Trademark Office.

* cited by examiner

*Primary Examiner* — Justin Holmes
(74) *Attorney, Agent, or Firm* — Harness, Dickey & Pierce, P.L.C.

(57) ABSTRACT

The invention relates to a differential gear having a differential housing in which two conical compensating gears are rotatably supported about a first axis of rotation and two conical output gears meshing with the compensating gears are rotatably supported about a second axis of rotation oriented at right angles to the first axis of rotation, wherein a spring device is arranged between the differential housing and at least one of the output and/or compensating gears to load it with a spring force.

14 Claims, 5 Drawing Sheets

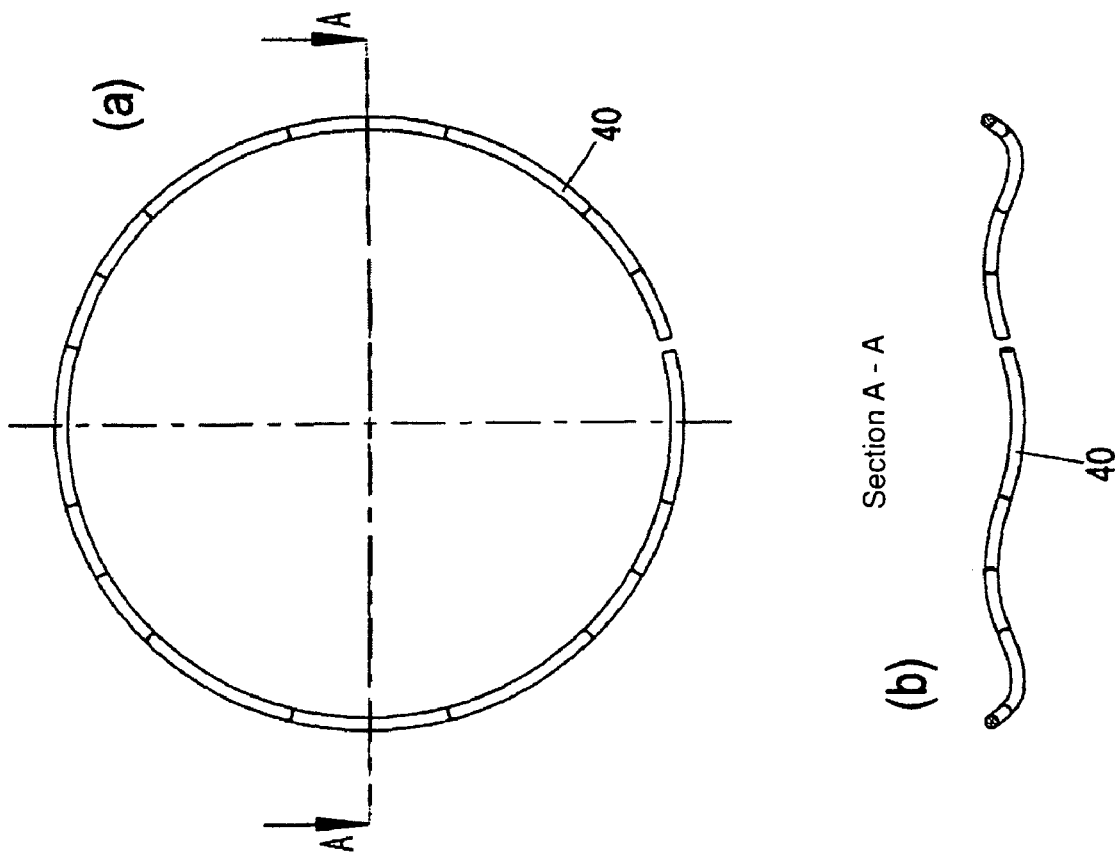

DIFFERENTIAL GEAR

CROSS-REFERENCE TO RELATED APPLICATIONS

Figure 1:
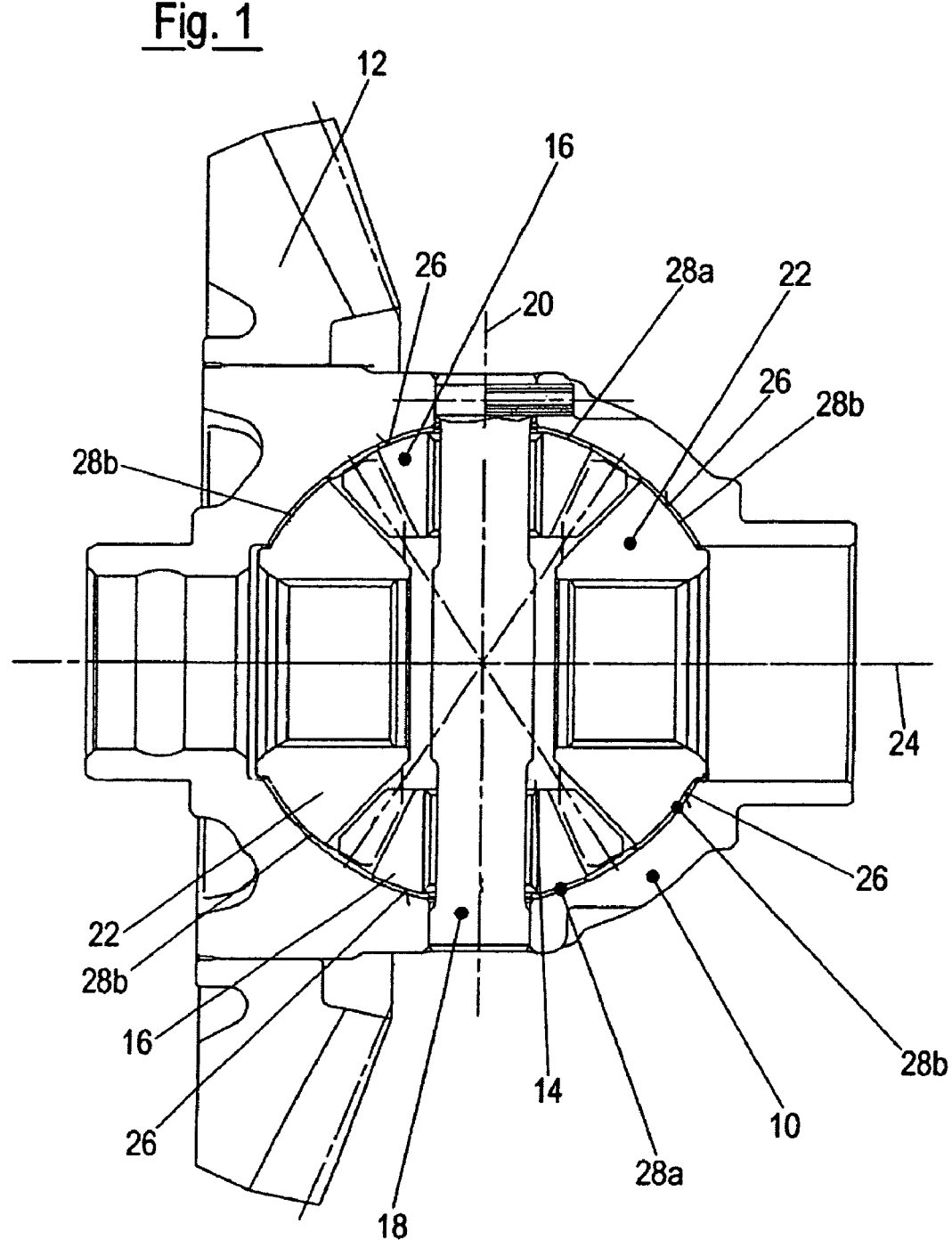

This application claims the benefit and priority of German Application No. 10 2008 010 306.3, filed Feb. 21, 2008. The entire disclosure of the above application is incorporated herein by reference.

FIELD

The invention relates to a differential gear having a differential housing in which two conical compensating gears are rotatably supported about a first axis of rotation and two conical output gears meshing with the compensating gears are rotatably supported about a second axis of rotation oriented at right angles to the first axis.

BACKGROUND

Such a differential gear is generally known and is used, for example, in a motor vehicle in order to allow different speeds of a wheel at the inside of a corner and a wheel at the outside of a cover on cornering. Differential gears are also called differential transmissions and the differential housing a differential basket. The output gears or compensating gears are also called bevel gears due to their conical form.

It is furthermore known to arrange a washer disk between an output gear or a compensating gear and an inner wall of the differential housing to avoid a running of the output gear or compensation gear into the differential housing and any wear associated therewith.

It has been found to be problematic with differential gears of the initially named kind that load changes in a powertrain, e.g. of a motor vehicle, coupled with the differential gear, can result in an unwanted noise development, a so-called load change knocking, in the differential transmission.

SUMMARY

It is the underlying object of the invention to provide a differential transmission in which the occurrence of unwanted noises, in particular on a load change in the powertrain, is at least largely suppressed.

The object is satisfied by a differential transmission having the features of claim 1 and in particular in that a spring device is arranged between the differential housing and at least one of the output gears and/or compensating gears to apply a spring force thereto.

The invention is based on the recognition that load change knocking generated on a load change in the differential transmission is caused by an unwanted flank clearance between the compensating gears or output gears arranged in the differential housing and meshing. The invention therefore provides eliminating the clearance in that at least one of the output gears and/or compensating gears is loaded by a spring device and is pressed toward the two bevel gears which mesh with the output gear or compensating gear. Due to the clearance elimination resulting from this, the spring device ultimately prevents the development of irritating noises and in particular knocking occurring on a load change.

While it is generally possible only to load a single output gear or compensating gear by a spring device in the manner described above, it is generally to be preferred on the basis of the distribution of forces in the differential housing to load respective mutually opposite bevel gears, i.e. that is both compensating gears or both output gears, by one respective spring device. It is naturally also possible to load all four bevel gears, i.e. that is both the two compensating gears and the two output gears by one respective spring device.

Advantageous embodiments of the invention can be seen from the dependent claims, from the description and from the drawing.

In accordance with an embodiment, the spring device is formed by a washer disk arranged between the differential housing and the output gear or compensating gear. This minimizes the construction size of the differential gear as well as the number of the components to be installed in the differential gear and provides the desired clearance compensation without substantially increasing the manufacturing costs and the weight of the differential gear in so doing.

The washer disk can, for example, comprise at least one bent over spring section, in particular a drawn up or drawn down spring section, which preferably projects from the washer disk itself, i.e. is an integral component thereof. The washer disk can so-to-say therefore be made in the manner of a plate spring A plurality of spring sections are advantageously arranged distributed along the outer periphery of the washer disk. A uniform action on the compensating gear or output gear associated with the washer disk is hereby achieved and ultimately a particularly effective play compensation.

In accordance with an alternative embodiment, the spring device includes a corrugated spring which can be formed from a round wire or a flat wire and can have a plurality of corrugations.

The corrugated spring can be arranged between the differential housing and a washer disk associated with the output gear or compensating gear. In this case, the spring device and the washer disk are separate components, whereby it is possible to optimize the washer disk, on the one hand, and the spring device on the other hand, respectively separately from one another with respect to their function.

To secure a correct positioning of the spring elements in the long term and simultaneously to ensure a compact construction shape of the differential gear, the spring element is preferably inserted into a recess, e.g. a circumferential groove, provided at the inner side of the differential housing.

The corrugated spring is preferably made in ring shape and is arranged substantially concentrically with the axis of rotation of the output gear or compensating gear for a loading of the output gear or compensating gear associated with the spring device which is as uniform as possible.

For the case that—as mentioned above—a plurality of output gears or compensating gears are each loaded by a spring device, for example both compensating gear and/or output gears, all the output gears or compensating gears can be loaded by the same type of spring device, i.e. either by washer disks made in plate-spring manner or by corrugated springs.

Alternatively, it is, however, equally possible to use both types of spring devices in the differential gear and, for example, to load the compensating gears in each case by a washer disk made in plate-spring manner and to load the output gears in each case by a corrugated spring, or vice versa.

Generally, a variant is also conceivable in which the one compensating gear or output gear is loaded by a washer disk made in plate-spring manner and the respective other compensating gear or output gear is loaded by a corrugated spring.

It is of advantage with both embodiments of the spring device for the minimization of wear phenomena if the washer disk is made from a material which is harder than the material of the differential housing. For example, the washer disk can be made from spring steel, in particular nitrided spring steel, whereby the washer disk is additionally particularly well suited to be made as a plate spring.

The solution in accordance with the invention for the reduction in the clearance between the compensating gears and the output gears and thus ultimately for the reduction in the load change knocking can be realized particularly easily when the side facing the washer disk, i.e. the rear side, of the output gear or compensating gear is made in the shape of a spherical cap and the washer disk has a spherically curved basic shape adapted thereto. If the rear sides of all output gears and compensating gears facing the differential housing are made in the shape of spherical caps and if the inner side of the differential housing is correspondingly made spherical, it is a case of a spherical differential gear which is also called a spherical differential.

Alternatively the side of the output gear or compensating gear facing the washer disk can be made planar and the washer disk can have a planar basic shape. The clearance compensation in accordance with the invention can in other words also be realized in a differential gear whose differential housing has an e.g. angular basic shape with inner sides planar at least sectionally.

DRAWINGS

Figure 2:
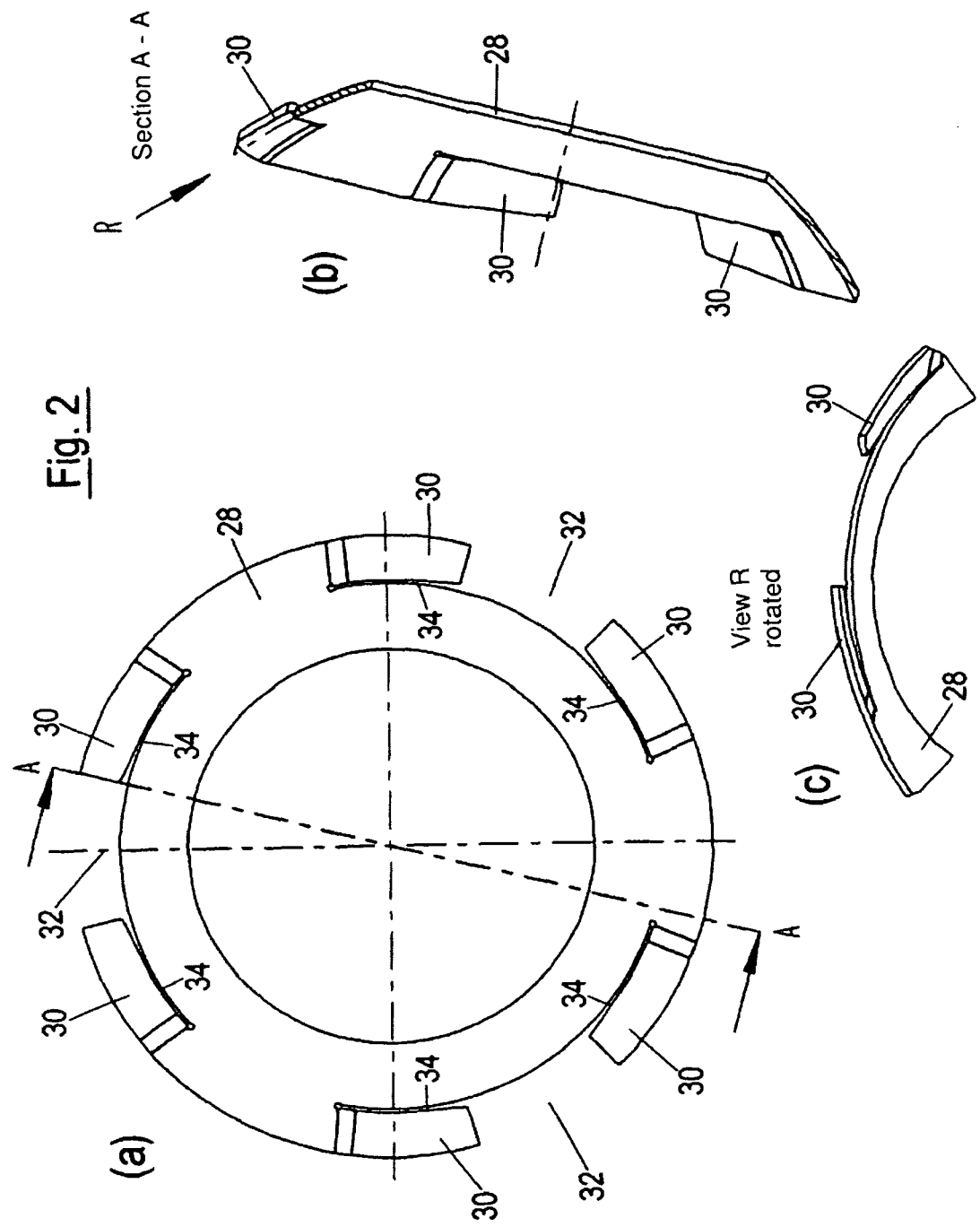
Figure 3:
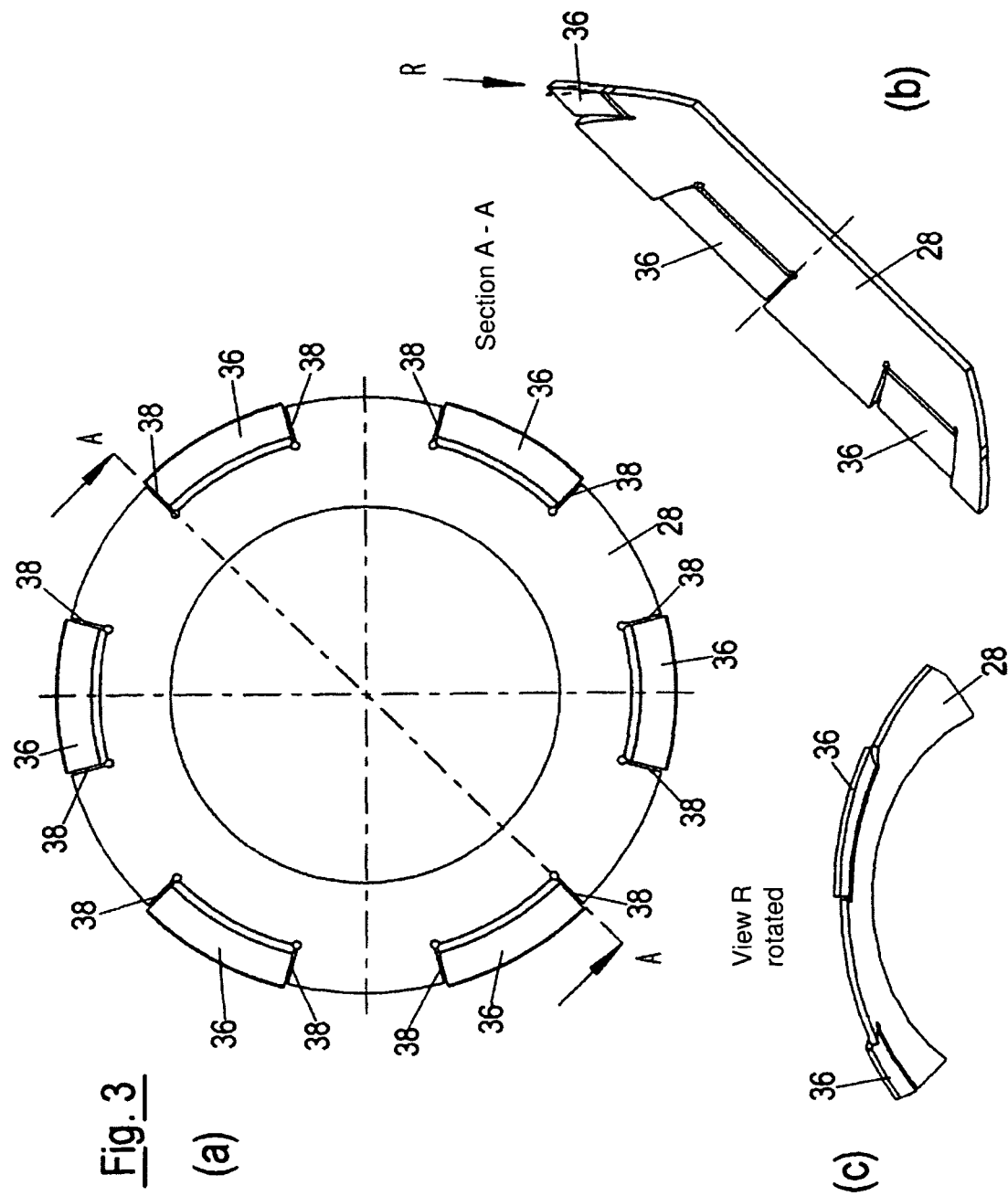
Figure 4:
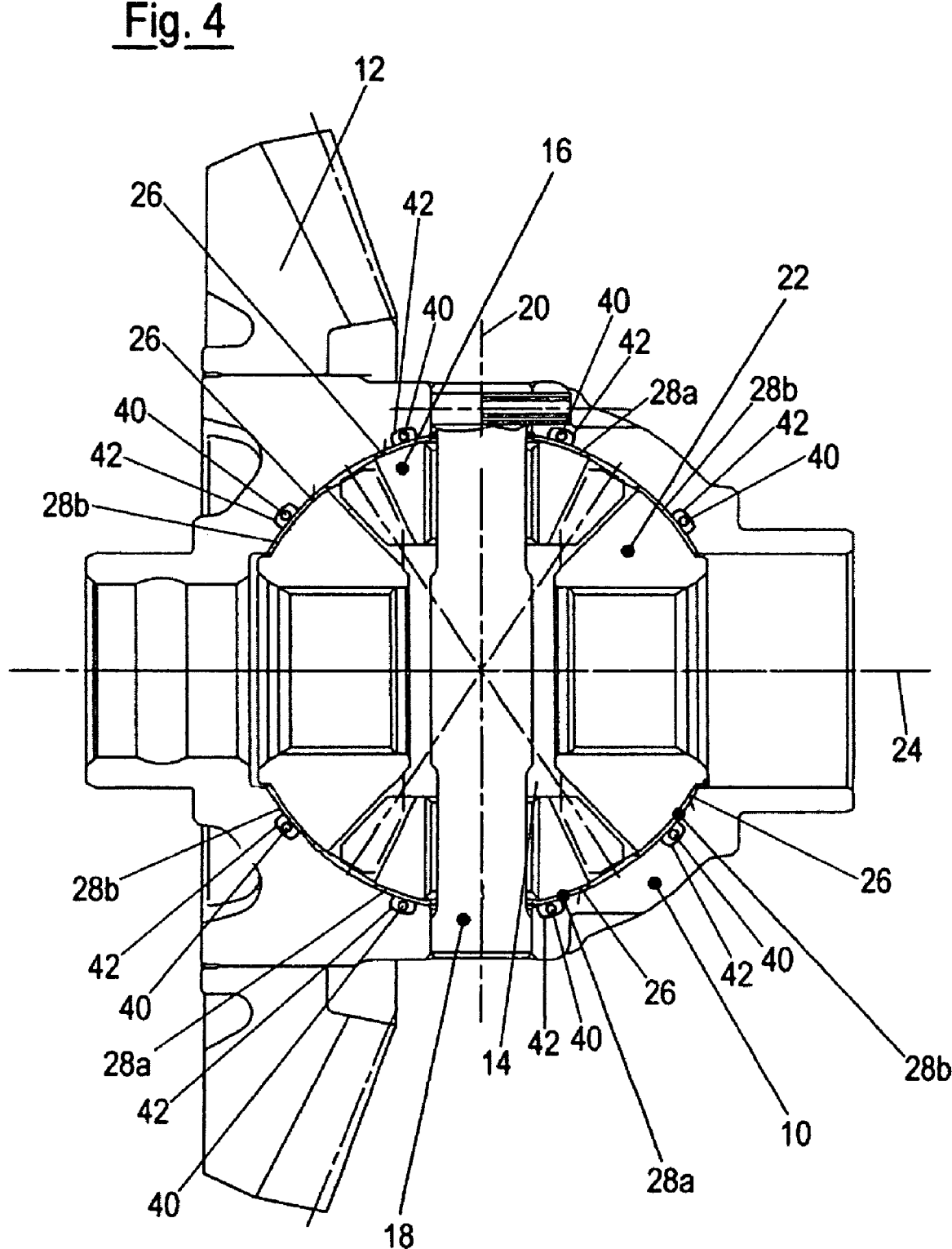

The invention will be described in the following purely by way of example with reference to advantageous embodiments and to the enclosed drawing. There are shown:

FIG. 1 a cross-sectional view of a differential gear in accordance with the invention in accordance with a first embodiment;

FIG. 2 (a) a plan view, (b) a cross-sectional view, and (c) a perspective view of a first variant of a plate spring-like washer disk of the differential gear of FIG. 1;

FIG. 3 (a) a plan view, (b) a cross-sectional view, and (c) a perspective view of a second variant of a plate spring-like washer disk of the differential gear of FIG. 1;

FIG. 4 a cross-sectional view of a differential gear in accordance with the invention in accordance with a second embodiment; and FIG. 5 (a) a plan view, (b) a cross-sectional view, and (c) a perspective view of a corrugated spring of the differential gear of FIG. 4.

DESCRIPTION

A differential gear in accordance with a first embodiment is shown in FIG. 1. The differential gear has a differential housing 10 which is rotationally fixedly connected to a crown gear 12 which can be driven by a drive shaft, not shown. The differential housing 10 defines a substantially spherical hollow space 14 so that the differential gear is also called a spherical differential.

Two conical compensating gears 16 are arranged in the hollow space 14 and are rotatably supported on a balance shaft 18 which is rotationally fixedly installed in the differential housing 10 and which defines a first axis of rotation 20.

The compensating gears 16 mesh with two conical output gears 22 which are rotatably supported about a second axis of rotation 24 oriented at right angles to the first axis of rotation 20 and which can be connected in each case rotationally fixedly to an output shaft, not shown.

The rear sides 26 of the compensating gears 16 and of the output gears 22 facing the differential housing 10 are made in spherical cap shape and are matched to the curvature of the inner side of the differential housing 10.

To prevent a running of the compensating gears 16 or of the output gear 22 onto the differential housing 10 and to minimize wear, a respective washer disk 28a or 28b is arranged between each compensating gear 16 and the differential housing 10 as well as between each output gear 22 and the differential housing 10, and indeed substantially concentrically with the axis of rotation 20 or 24 of the respective compensating gear or output gear 16, 22. The washer disks 28a, 28b are made from a material which is harder than the material of the differential housing 10, in the present embodiment of nitrided spring steel.

As can be seen from FIGS. 2 and 3, the washer disks 28 each have a ring-like basic shape with a spherical curvature which is adapted to the curvature of the rear side 26 of the respectively associated compensating gear or output gear 16, 22 and thus also to the curvature of the inner surface of the differential housing 10.

In order, in addition to the avoidance of a running of the compensating gears and output gears 16, 22 onto the differential housing 10, to provide a clearance compensation between the compensating gears and the output gears 16, 22 and to suppress the occurrence of disturbing noises on a load change in the powertrain, the washer disks 28 are additionally made in plate-spring manner.

FIG. 2 shows a first variant of a plate spring-like washer disk 28 which has a plurality of sprig sections 30, six in the present embodiment, which, extending in the circumferential direction, are arranged distributed along the outer margin of the washer disk 28. The spring sections 30 are formed by tongues which project from the washer disk 28 and which are made by the removal of marginal sections 32 and by the introduction of slots 34 extending in the circumferential direction into the washer disk 28 (FIG. 2a).

As can be recognized particularly well in FIG. 2b and FIG. 2c, the spring sections 30 are bent over, that is so-to-say drawn up, viewed in the circumferential direction and outwardly, i.e. away from the respectively associated compensating gear or output gear 16, 22. The spring sections 30 bent over or drawn up in this manner are supported at the inner side of the differential housing 10, whereby the compensating gear or output gear 16, 22 associated with the washer disk 28 are loaded by a specific spring force and is pressed in the direction of the output gears or compensating gears 22, 16 with which it is in engagement. It is ensured in this manner that the compensating gears and output gears 16, 22 always mesh with one another ideally and in particular free of clearance.

A second variant of a plate-like washer disk 28 is shown in FIG. 3 which likewise has a plurality of spring sections 36 projecting from the washer disk 28. The spring sections 36 are arranged distributed uniformly along the outer margin of the washer disk 28 viewed in the circumferential direction and are formed by two respective mutually spaced apart slots 38 extending in the radial direction. In further difference to the spring sections 30 of the first variant shown in FIG. 2, the spring sections 36 of the second variant shown in FIG. 3 are not bent over or drawn up in the circumferential direction, but rather in the radial direction.

The washer disk 28 in accordance with the second variant shown in FIG. 3 is also supported at the inner side of the differential housing 10 via the drawn up spring sections 36 to load the compensating gear or output gear 16, 22 respectively associated with the washer disk 28 with a spring force and to press it in the direction of the output gears or compensating gears 22, 16 with which the compensating gear or output gear 16, 22 associated with the washer disk 28 meshes.

Although only drawn up spring sections 30 and 36 respectively are shown in FIGS. 2 and 3, it must be pointed out that at least one of the spring sections 30 and 36 respectively of a washer disk 28 can also be bent over, that is so-to-say drawn down, inwardly, i.e. toward the respectively associated compensating gear or output gear 16, 22. A spring section 30 or 36 bent over or drawn down inwardly in this manner, is supported at the respectively associated compensating gear or output gear 16, 22 and loads it with a specific spring force to ensure that the compensating gears and output gears 16, 22 always mesh ideally and in particular free of clearance with one another.

A second embodiment of a differential gear in accordance with the invention is shown in FIG. 4 which only differs from the differential gear in accordance with the first embodiment shown in connection with FIGS. 1 to 3 in the way the clearance between the meshing compensating and output gears 16, 22 is compensated.

Unlike the washer disks 28a, 28b shown in FIGS. 2 and 3, the washer disks 28a, 28b of the differential gear in accordance with the second embodiment shown in FIG. 4 do not have any spring sections, i.e. the washer disks 28a, 28b in accordance with the second embodiment have a uniformly spherical shape over their total extent.

To nevertheless load the compensating gear or output gear 16, 22 respectively associated with the washer disks 28a, 28b with a spring force and to be able to press it in the direction of the output gears or compensating gears 22, 16 meshing therewith, a separate spring element is arranged between each washer disk 28a, 28b and the differential housing 10.

The spring element is a ring-shaped corrugated spring 40 which is inserted, for the ensuring of an exact positioning and for the maintenance of a construction shape of the differential gear which is as compact as possible, into a recess 42 which is provided at the inner side of the differential housing 10 and which is made by a groove extending concentrically with the first or second axis of rotation 20, 24.

As FIG. 5 shows, the corrugated spring 40 is formed by a round wire which is bent over multiply along its length for the formation of a plurality of corrugations preferably arranged uniformly distributed. Alternatively, the corrugated spring 40 can also be formed by a flat wire.

The corrugated spring 40 comprises a spring-elastic material which, together with the corrugated shape of the corrugated spring 40, ensures that the compensating gear or output gear 15, 22 associated with the corrugated spring 40 is loaded with a spring force via the corresponding washer disk 28a, 28b, whereby a clearance between the compensating gear or output gear 22 and the output gears or compensating gears 22, 16 meshing therewith is eliminated and an irritating noise resulting therefrom, in particular load change knocking, is suppressed.

It must be pointed out that the corrugated springs 40 of the second embodiment shown in FIG. 4 can generally also cooperate directly with the respectively associated compensating gear or output gear 16, 22 with a suitable surface coating of the compensating gears or output gears 16, 22 and/or of the corrugated springs 40, which generally makes it possible to dispense with the washer disks 28a, 28b.

The invention claimed is:

1. A differential gear having a differential housing (10) in which two conical compensating gears (16) are rotatably supported about a first axis of rotation (20) and two conical output gears (22) meshing with the compensating gears (16) are rotatably supported about a second axis of rotation (24) oriented at right angles to the first axis of rotation (20), wherein a spring device is arranged between the differential housing (10) and at least one of the output gears and/or compensating gears (16, 22) to load it with a spring force, the spring device comprising a washer disk including a plurality of bent over spring sections extending in a circumferential direction and distributed along an outer margin of the washer disk.

2. A differential gear in accordance claim 1, characterized in that the washer disk (28) arranged between the differential housing (10) and the output gear or compensating gear (16, 22) is made from a material which is harder than the material of the differential housing (10).

3. A differential gear in accordance with claim 1, characterized in that the washer disk (28) arranged between the differential housing (10) and the output gear or compensating gear (16, 22) is made of nitrided spring steel.

4. A differential gear in accordance with claim 1, characterized in that a side (26) of the output or compensating gear (16, 22) facing the washer disk (28) is made in the shape of a spherical cap and the washer disk (28) has a spherically curved base shape adapted thereto.

5. A differential gear in accordance with claim 1, wherein the bent over spring sections are monolithically formed with the washer disk.

6. A differential gear in accordance with claim 5, wherein the spring sections are formed as tongues projecting from the washer disk.

7. A differential gear in accordance with claim 6, wherein the tongues are circumferentially spaced apart with marginal sections of the washer disk being removed between adjacent tongues.

8. A differential gear in accordance with claim 1, wherein the spring sections are cantilevered from the washer disk and include an edge defined by a circumferentially extending slot in the washer disk.

9. A differential gear having a differential housing (10) in which two conical compensating gears (16) are rotatably supported about a first axis of rotation (20) and two conical output gears (22) meshing with the compensating gears (16) are rotatably supported about a second axis of rotation (24) oriented at right angles to the first axis of rotation (20), wherein a spring device is arranged between the differential housing (10) and at least one of the output gears and/or compensating gears (16, 22) to load it with a spring force, wherein the spring device includes a corrugated spring (40) inserted into a circular groove (42) provided at the inner side of the differential housing (10), the circular groove being arranged substantially concentrically with the axis of rotation of the output gear or compensating gear.

10. A differential gear in accordance with claim 9, characterized in that the corrugated spring (40) is arranged between the differential housing (10) and a washer disk (28) associated with the output gear or compensating gear (16, 22).

11. A differential gear in accordance with claim 9, characterized in that the corrugated spring (40) is made from a round wire or a flat wire.

12. A differential gear in accordance with claim 9, characterized in that the corrugated spring (40) is made in ring shape and is arranged substantially concentrically with the axis of rotation (20, 24) of the output gear or compensating gear (16, 22).

13. A differential gear having a differential housing (10) in which two conical compensating gears (16) are rotatably supported about a first axis of rotation (20) and two conical output gears (22) meshing with the compensating gears (16) are rotatably supported about a second axis of rotation (24) oriented at right angles to the first axis of rotation (20), wherein a spring device is arranged between the differential housing (10) and at least one of the output gears and/or compensating gears (16, 22) to load it with a spring force, the spring device comprising a washer disk including a plurality of bent over spring sections extending in a radial direction and distributed along an outer margin of the washer disk, the bent over spring sections being shaped as upturned flaps intersecting an adjacent portion of the washer disk at an angle.

14. A differential gear in accordance with claim 13, wherein each spring section is monolithically formed with the washer disk and includes edges defined by spaced apart and radially extending slots.

\* \* \* \* \*